Nov. 26, 1940.  C. C. DAGGETT  2,223,096
VALVE BEARING
Filed Jan. 20, 1938   2 Sheets-Sheet 1
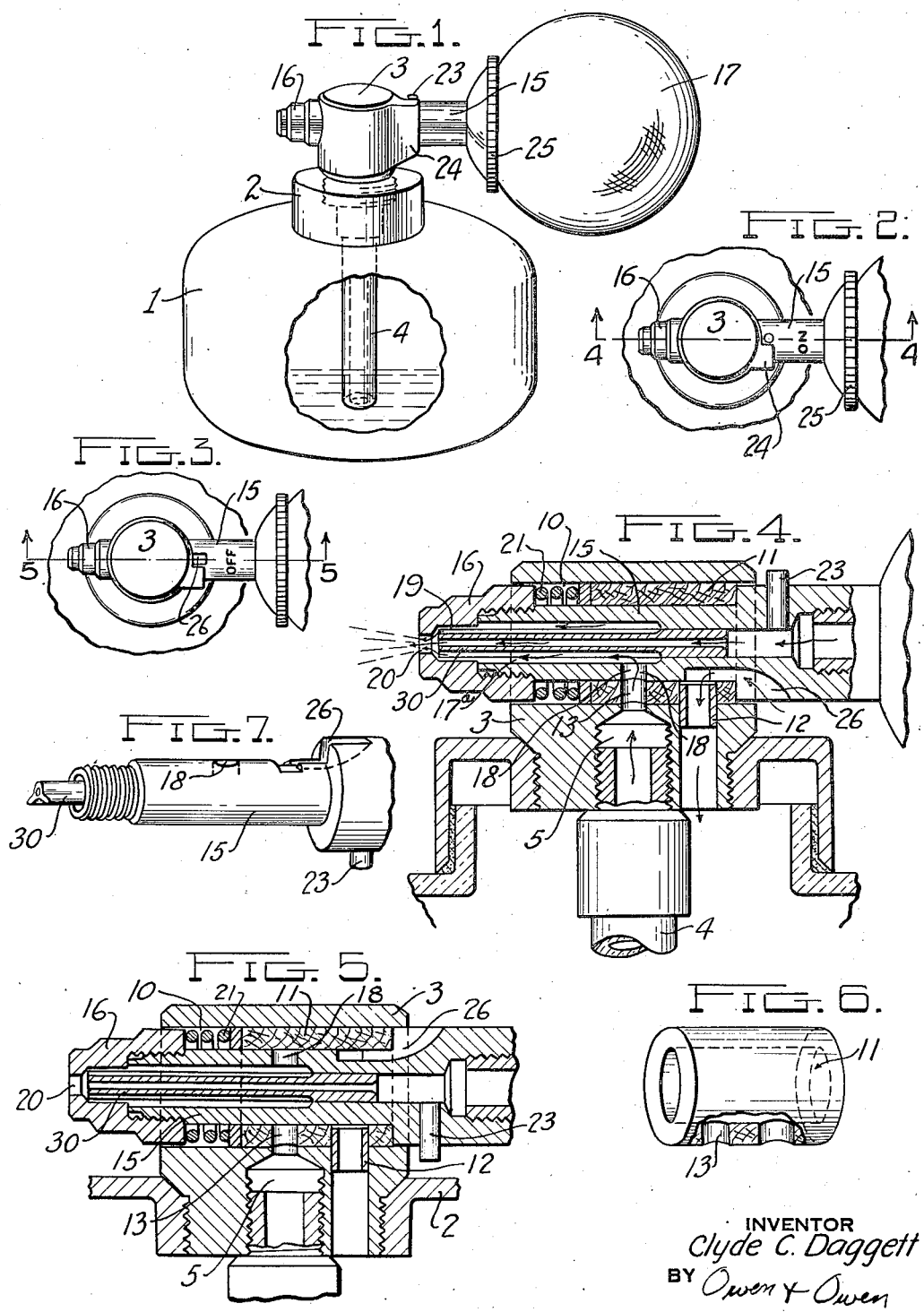
INVENTOR
Clyde C. Daggett
BY Owen & Owen
ATTORNEY Nov. 26, 1940.    C. C. DAGGETT    2,223,096
VALVE BEARING
Filed Jan. 20, 1938    2 Sheets-Sheet 2
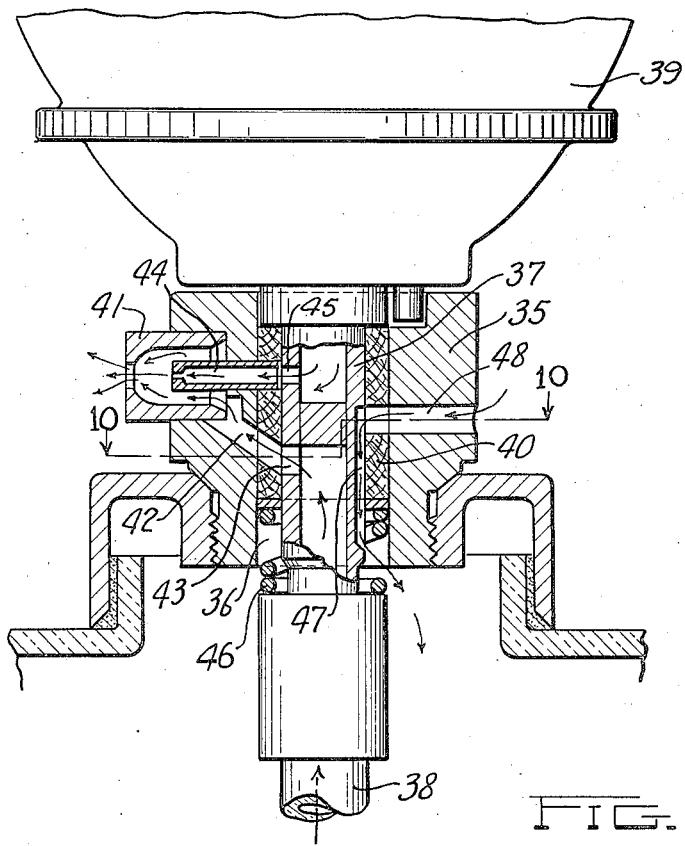
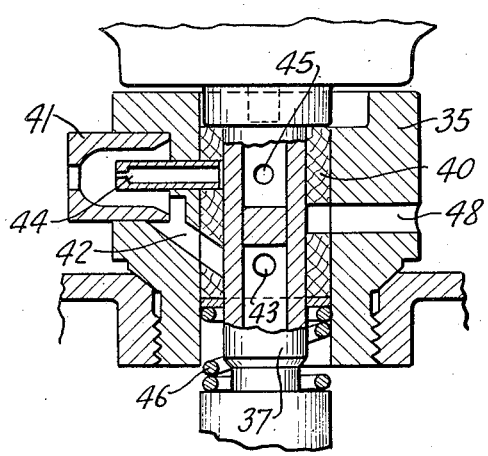
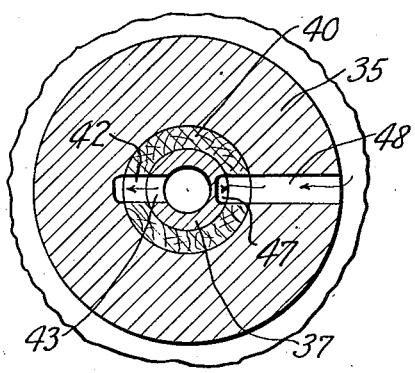
INVENTOR
Clyde C. Daggett
BY Owen & Owen
ATTORNEY Patented Nov. 26, 1940

2,223,096

UNITED STATES PATENT OFFICE 2,223,096

VALVE BEARING

Clyde C. Daggett, Toledo, Ohio, assignor to The De Vilbiss Company, Toledo, Ohio, a corporation of Ohio Application January 20, 1938, Serial No. 185,939

6 Claims. (Cl. 251—113)

This invention has special reference to use in atomizers, and particularly to those of the toilet type adapted to be closed against leakage of liquid therefrom when not in use.

Atomizers of this class in the past have been more or less expensive due to the necessity of providing tight joints to prevent leakage.

The primary object of the invention is the provision of a bearing means for the valve members of atomizers of this character which is of simple, efficient and inexpensive construction.

A further object of the invention is the provision of a bearing member for a movable valve part of an atomizer, which member is of a nature to have a very slight expansion of predetermined maximum extent by reason of liquid absorption, whereby the joint formed in part by such member is sufficiently tight to prevent leakage but not to prevent free manual movement of the valve part.

Further objects and advantages of the invention will be apparent from the following detailed description, and from the accompanying drawings, in which—

Figure 1 is a perspective side view of an atomizer embodying the invention, with a part broken away; Figs. 2 and 3 are fragmentary top views thereof, with the valve parts respectively in "on" and "off" positions; Fig. 4 is an enlarged vertical fragmentary section on the line 4—4 in Fig. 2; Fig. 5 is a similar section on the line 5—5 in Fig. 3; Fig. 6 is a perspective view, partly broken away, of the bearing sleeve member for the valve parts; Fig. 7 is a fragmentary perspective view of the valve tube with the air nozzle projecting therefrom; Fig. 8 is an enlarged fragmentary view of an atomizer, partly in central vertical section, showing a different embodiment of the invention, with the valve parts in "on" position; Fig. 9 is a similar view, with the valve parts in "off" position, and Fig. 10 is a cross-section on the line 10—10 in Fig. 8.

Referring to Figs. 1 to 7 of the drawings, 1 designates a liquid receptacle of the bottle type having its neck provided with the customary ferrule 2, with the atomizer spray-head 3 in threaded engagement therewith. A liquid tube 4 is threaded, or otherwise secured, in the throat bore 5 of the head 3 and projects down into the receptacle to near its bottom, as well understood in the art.

The head 3 above the throat bore 5 is provided with a cylindrical cross bore 10 and within this bore is mounted a bearing bushing 11 of a slightly absorbent nature, as hereinafter more fully described. This bushing is fixedly secured in the head bore, in the present instance by a vent tube 12, which is mounted in registering openings in the sleeve and head and provides a passage between the interior of the receptacle and the atmosphere, as hereinafter described. The bushing 11 also has an opening 13 through its wall in permanent communication with the throat bore 5. The bushing preferably terminates short of each end of the head bore 10, as shown.

A valve tube 15 is mounted for rotary movements in the bushing 11 and, in the present instance, carries a liquid discharge nozzle 16 at its front end and an air pressure bulb 17 at its rear end. The bore of this tube is enlarged at its forward end portion, as shown at 17ª, with such enlargement in communication, through a port 18 in its side wall, with the liquid supply opening 13 in the bushing 11 when the valve tube is in "on" or open position, as shown in Fig. 4. The forward end of the bore enlargement 17 is in communication through the nozzle chamber 19, with the nozzle discharge orifice 20. The valve tube 15 is enlarged at its rear end portion without the bushing 11 to shoulder against its rear end and is yieldingly held seated against such end of the sleeve by a coiled expansion spring 21 which encircles the tube in advance of the bushing with its rear end thrust against the adjacent bushing end and its forward end thrust against the rear end of the nozzle 16, which latter is preferably threaded on the tube 15.

A pin 23 is provided on the rear end portion of the tube 15 in position to coact with a registering projecting part 24 of the head 3 to limit the "on" and "off" turning movements of the valve 2. To facilitate manual turning movements of the tube 16, it is provided at its rear end in adjacent relation to the forward end of the bulb 17 with an enlarged knurled finger grip portion 25. The tube 15 is provided in the same side thereof as the port 18 with a groove 26 adapted to register at its forward end with the vent tube 12 when the tube 15 is in "on" position, as shown in Fig. 4, and to have its outer end in communication with the atmosphere. The forward end portion of the groove 26 is shown as being peripherally broadened to facilitate register with the vent passage.

The air nozzle tube 30 is fitted in and projects forward from the bore of the valve tube 15 through the bore enlargement 17 in spaced relation to its wall and into the nozzle chamber 19 in spaced relation thereto and with its free end preferably terminating short of the nozzle orifice 20. It is thus apparent that the discharge of air from the air nozzle 30 through the orifice 20 will induce a suction action through the liquid passage parts of the atmosphere to draw liquid from the receptacle and discharge it from the orifice 20 in spray-form, as well understood in the art.

It is desirable, in the present instance, to make the bushing 11 of a material which will expand only slightly when subjected to moisture so as to provide a liquid tight joint between the bushing and valve tube and also the bushing and head 3 without at the same time causing a gripping or binding of the parts to prevent relative ready turning thereof. It has been determined that an expansion of substantially three-tenths of a thousandth of an inch in diameter of the bushing is suitable for this purpose. Such bushing was obtained by making it from hard wood, thoroughly impregnating the wood with synthetic resin and then baking. One method of doing this is to impregnate the bushing with synthetic resin under vacuum action and to then bake it for about fourteen hours at a temperature of approximately 350° F. Suitable impregnating materials are those known by the commercial names of "Bakelite" and "Glyptol".

In Figs. 8 to 10, there is shown a form of the invention wherein the spray is discharged in a direction transverse to the axis of the valve tube. In this form, 35 designates the spray-head of the atomizer and 36 the bore therethrough in which the valve tube is mounted, such bore being vertically disposed with its lower end in communication with the interior of the associated receptacle. The valve tube is designated 37 and has its lower end connected to and carrying the liquid tube 38 for extending down into the receptacle, while its upper end carries the compression bulb 39. The tube 37 has a bearing in a bushing 40 which is similar to that previously described and is fixedly mounted in the bore 36. The liquid nozzle 41 is mounted on a side of the spray-head 30 and has its chamber in communication through a passage 42 in the head and bushing 40 with a side port 43 in the tube 37 when the tube is in "on" position, as shown in Fig. 8. The air nozzle is formed by a tube 44 which has its discharge end projected into the chamber of the nozzle 41 with its discharge orifice registering with that of the nozzle 41. The inner end of said tube projects through a portion of the head and into the bushing 40 to firmly anchor the bushing within the head and at the same time to have its inner end in communication with the air outlet port 45 in a side of the valve tube 37 when such tube is in "on" position. The passage of the tube 37 is closed between the ports 43 and 45. The enlarged upper end of the tube 37 is held yieldingly seated against the upper end of the bushing 40 by a spring 46 interposed between the lower end of the bushing and a shouldered portion of the liquid tube 38. When the valve tube 37 is in "on" position, as shown in Fig. 8, an air vent between the interior of the receptacle and the outside of the atmosphere is provided through a side passage 47 in the tube 37 and registering passage 48 in the head 35 and bushing 40, the lower end of the passage 47 being in constant communication with the interior of the receptacle. The operation of this form of atomizer is apparent.

In each form of atomizer shown, the rotatable valve tube is mounted in a bushing of a nature to absorb a small amount of the liquid being atomized and to expand very slightly under such absorption so as to provided a liquid tight joint between the bushing and both the head and the valve tube without at the same time causing a binding of the tube within the bushing, thus preventing leakage of liquid from the receptacle through the spray-head when the valve tube is in "off" position and at the same time permitting an easy turning of the tube to "on" and "off" positions.

I wish it understood that my invention is not limited to any specific construction, arrangement or form of the invention, as it is capable of numerous modifications and changes without departing from the spirit of the claims.

Having thus described my invention, what I claim as new, and desire to secure by United States Letters Patent, is:

1. In a valve bearing, two relatively movable members, and a bushing forming a bearing between said members and with respect to which at least one of the members may have movement, said bushing being of wood impregnated with synthetic resin and baked to permit a very slight expansion of the bushing when subjected to moisture, whereby a liquid tight joint is provided between the bushing and said members without a relative binding of the movable member and bushing.

2. In a valve bearing, two relatively movable members, and a bushing forming a bearing between said members in coaction with each and with respect to which at least one of the members is adapted to have movement, said bushing comprising hard wood impregnated with a synthetic resin and baked, whereby the bushing is adapted to expand in diameter under moisture absorption not to exceed substantially five-tenths of a thousandth of an inch.

3. In a valve bearing for atomizers, two relatively movable members, one having a bearing within the other, one of said members being non-expansible when subjected to moisture and the other comprising a body of wood impregnated with synthetic resin and baked to limit expansion of the body a predetermined extent when subjected to moisture, whereby the members may be easily assembled without binding when the said treated member is in a substantially dry state and may have a comparatively free turning liquid tight coaction when permissible expansion takes place in the treated member when subjected to moisture.

4. In a valve bearing for atomizers, two relatively movable members, one having a bearing within the other, one of said members comprising a body of hard wood impregnated with a material such as "Bakelite" or "Glyptol" and baked to limit expansion of the body a predetermined extent when subjected to moisture, whereby the members may be freely assembled or separated when the treated member is in a dry state and may have substantially free turning liquid tight coaction when permissible expansion takes place in said last member when subjected to moisture.

5. In a valve bearing for atomizers, two relatively movable members, one having a movable bearing within the other, one of said members comprising a body of wood in its normal state impregnated under predetermined heat conditions with a synthetic resin material such as "Bakelite" or "Glyptol" to limit expansion of the body under moisture absorption to not exceed a predetermined extent.

6. In a valve bearing for atomizers, two relatively movable members, one having a rotatable bearing within the other, one of said members being non-expansible when subjected to moisture and the other comprising a body of hard wood impregnated under predetermined heat conditions with a synthetic resin material such as "Bakelite" or "Glyptol" to limit diametrical expansion of the body under moisture absorption to substantially three-tenths of a thousandth of an inch.

CLYDE C. DAGGETT.